June 4, 1963

O. R. TITCHENAL 3,092,233

FLEXIBLE CONVEYOR

Filed Nov. 24, 1961

INVENTOR.
OLIVER R. TITCHENAL.
BY
Ward, Neal, Haselton, Orme & McChannon
ATTORNEYS.

June 4, 1963   O. R. TITCHENAL   3,092,233
FLEXIBLE CONVEYOR
Filed Nov. 24, 1961   2 Sheets-Sheet 2
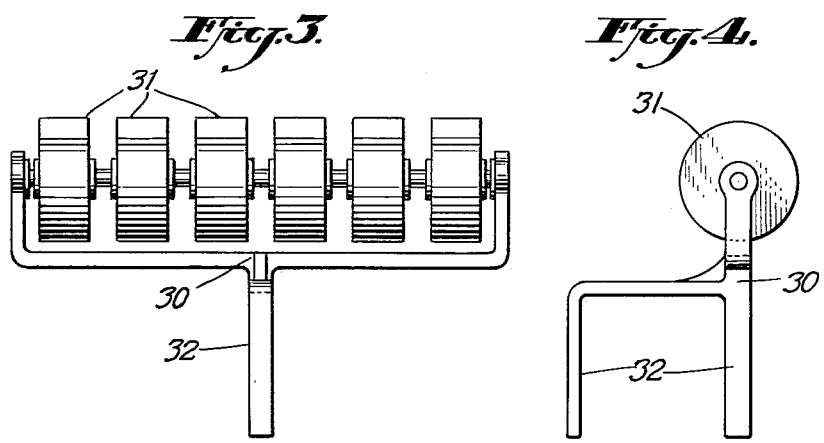
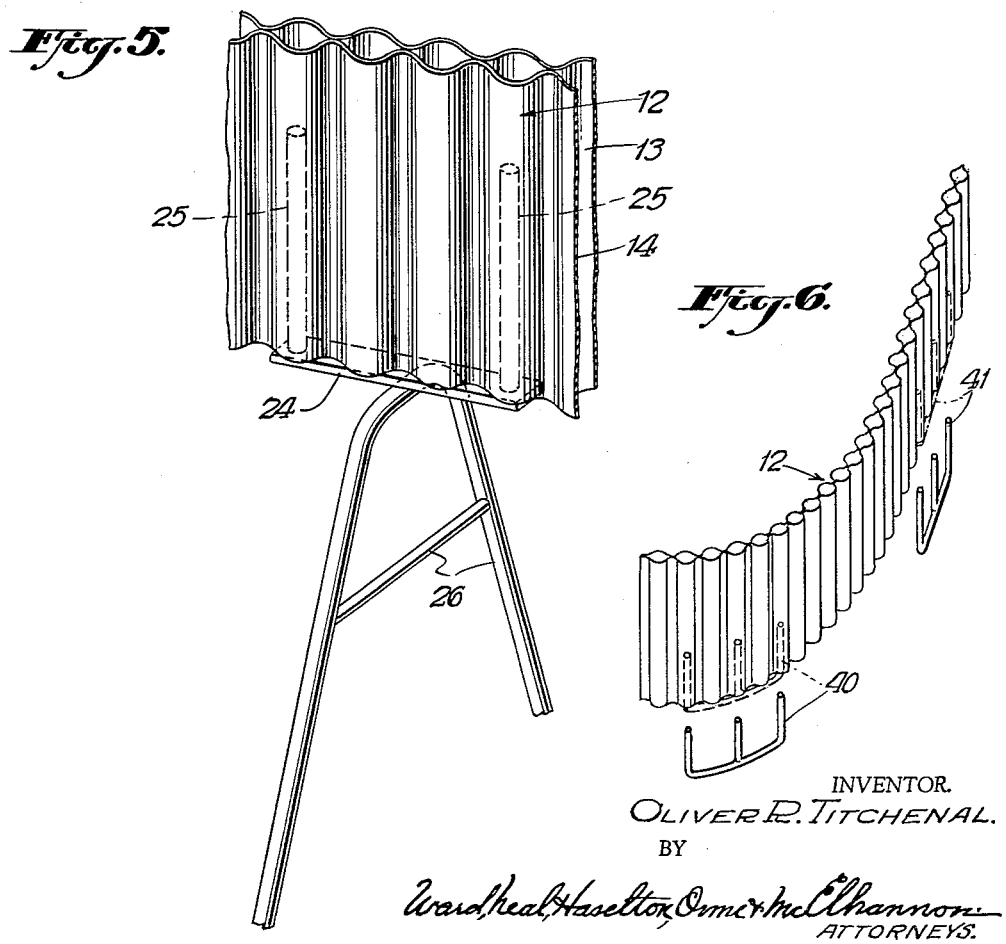
INVENTOR.
OLIVER R. TITCHENAL.
BY
Ward, Neal, Haselton, Orme & McElhannon
ATTORNEYS.

United States Patent Office 3,092,233
Patented June 4, 1963

3,092,233
FLEXIBLE CONVEYOR
Oliver R. Titchenal, Rumford, R.I., assignor to St. Regis Paper Company, New York, N.Y., a corporation of New York
Filed Nov. 24, 1961, Ser. No. 154,468
11 Claims. (Cl. 193—35)

This invention relates to conveyors and more particularly conveyors of a generally portable nature and of a flexible construction such that they may be arranged to convey articles along various desired curved paths. The invention makes possible an inexpensive, simple, durable and dependable construction for this purpose.

In accordance with the invention, a flexible conveyor is provided of which the main body or frame portion is formed of corrugated sheet material such as of steel or other metal or possibly in some cases of plastic or laminated plastic sheet material. An elongated strip of such material is provided and arranged in such manner that the corrugations extend vertically and generally a plurality, preferably a pair, of such strips are provided and suitably secured together face to face along the opposed ridges of the corrugations so as to provide a series of vertically-extending apertures or holes therebetween. Brackets or other attachments for carrying the conveyor rollers, or equivalent means, may be formed with supporting rods or studs slidable into place into such vertically-extending holes and so as to be readily removable therefrom if desired, or moved from certain of the vertical holes to others to alter the spacing of the conveyor roller brackets or to substitute alternative types or sizes of roller brackets for different purposes, if desired. The openings or holes between the corrugated strips may, along the bottom edge of the corrugated sheets, be well adapted to receive rods or studs to which are attached supporting legs or roller arrangements for the conveyor, these also, if desired, being readily removable slidably to permit alteration of the spacing of the supports or the use of alternative types of supports and also to permit the whole assembly to be readily taken apart for shipment or movement from one location to another.

Various further and more specific objects, features and advantages of the invention will appear from the description given below, taken in connection with the accompanying drawings, illustrating by way of example a preferred form of the invention.

FIGS. 3 and 4 respectively are front and side elevational views of a typical bracket with conveyor rollers which may be removably applied at the upper edge of the conveyor assembly;

FIG. 5 is a view of one form of supporting leg structure which may be used for the conveyor arrangement; and FIG. 6 is a perspective view illustrating another feature of the invention.

Figure 1:
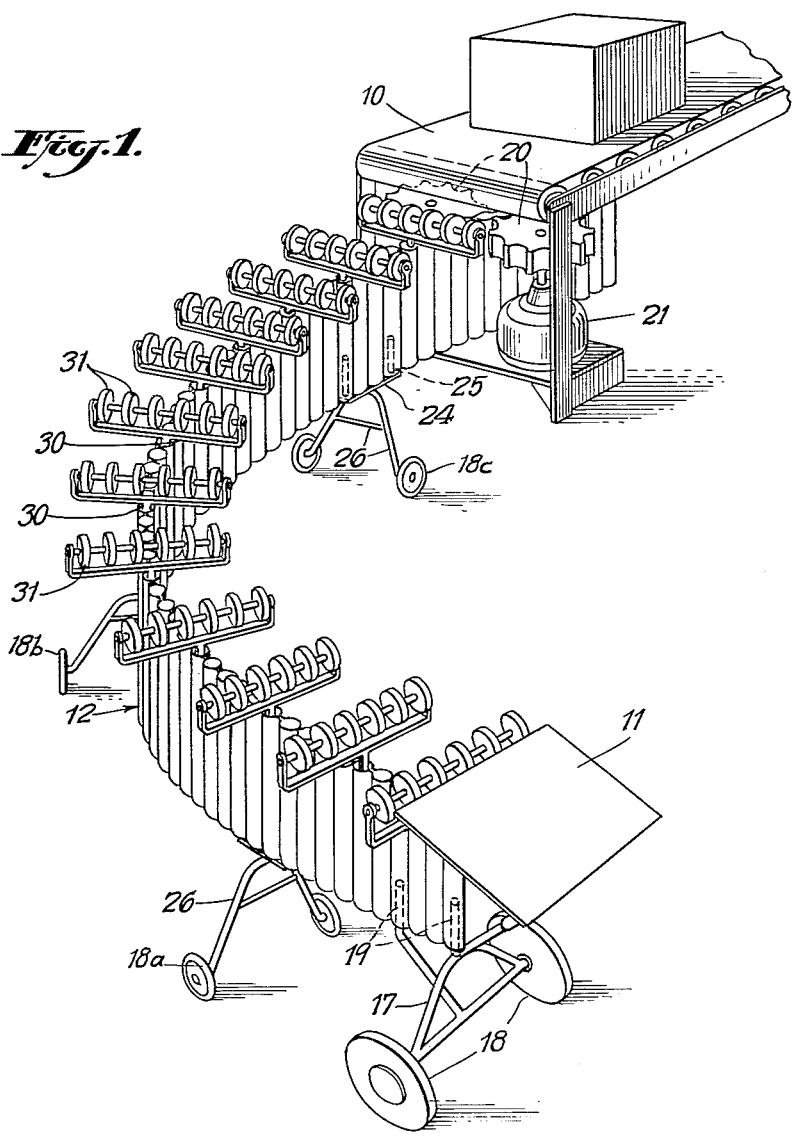
FIG. 1 is a perspective view showing the assembly and related parts of a preferred embodiment of the invention.

Referring now to the drawings in further detail, there is shown in FIG. 1 a flexible conveyor arranged in a position to convey articles or commodities along a curved path, for example extending from a known form of roller conveyor 10 located in a fixed position, the arrangement being adapted for receiving the articles from that conveyor and supporting same while they are pushed along a desired curved path to a discharge tray, for example as at 11.

Figure 2:
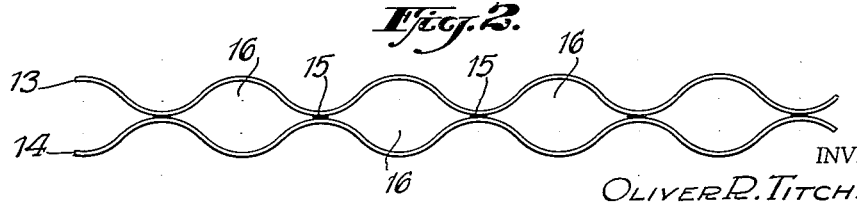
FIG. 2 is a plan view of a section of the main supporting means for the conveyor comprised of the strips of corrugated sheet material secured together.

As above indicated, the main body portion or "frame" 12 of the conveyor may comprise simply a pair of corrugated strips of sheet material, as at 13, 14, as shown in FIG. 2, these strips being positioned face to face and suitably secured together along the ridge portions of the corrugations as at 15. For example, if the corrugated strips are formed of sheet steel or other metal, same may be spot welded together along lines indicated at 15, or if the strips are, for example, of non-metallic material such as laminated plastic material, same may be riveted together. In any case, it will be noted that the pair of strips when thus assembled, provides a series of vertical apertures as at 16, and, because of the tubular construction thus afforded, the two assembled strips have very substantial strength against bending or breakage in any direction, except that they may be flexed in generally horizontal directions to either side, and as desired, to have the conveyor follow a predetermined curved path. Yet even in horizontal directions, the assembly will not be so flexible as to permit portions of the conveyor easily to move away from the desired path after once it has been placed along such path. Thus the conveyor is well adapted to be used for conveying articles for instance from a predetermined fixed position to the entrance of a vehicle such as a railroad car or over the gangplank of a ship or into a truck, and particularly in cases where the desired path of movement may change from time to time, depending on the particular location of the vehicle, as well as in cases where a rigid, straight conveyor could not be used because of intervening posts, columns or other obstacles, necessitating flexing of the conveyor to one side of, or around such obstacles.

The corrugated assembly as shown in FIG. 2 is well adapted to be flexed horizontally to either side along relatively smooth extended curvatures such that when the conveyor roller assemblies are mounted thereon, articles may be conveyed without danger of falling off at any abrupt curvatures.

In order to support the lower edge of the frame or body portion of the conveyor, supporting leg structures may be used such as shown at 17 in FIG. 1 and having wheels as at 18. This assembly may be attached to the corrugated structure as by rod or pin portions as shown in dotted lines at 19, adapted to be slidably and removably received in two of the vertical channels or holes such as shown at 16 in FIG. 2. Thus the supporting assembly 17 may readily be removed when the conveyor arrangement is to be collapsed for any reason or in case it is desired to substitute another form of leg or supporting means. The supporting means with rollers, as shown in FIG. 1, is particularly well adapted for supporting the outer end of the conveyor arrangement when the arrangement is set up as shown in FIG. 1 in a manner permitting same to be pulled upwardly, for example from a storage position beneath the fixed conveyor 10. This may be done manually or, if preferred, power-operated large fiber gears, as at 20, may be provided, these gears having peripheries shaped to fit in the corrugations on the opposite faces of the body portion 12 of the conveyor arrangement. Thus for example a reversible motor as at 21 may be used to drive one of the gears to move the conveyor arrangement out to active position, or upon reversing the motor, to move the arrangement back into a storage position.

Another form of supporting and leg arrangement is shown in FIG. 4 wherein a bracket 24 is provided having a pair of studs or rods as at 25 adapted respectively to be slidably and removably received in two of the spaced holes 16 between the corrugated strips. The bracket 24 may have suitable leg structure affixed thereto as indicated at 26. It will be understood that leg assemblies as shown in FIG. 5, or alternatively as shown at 17 in FIG. 1, may be removably inserted at suitably-spaced intervals along beneath the body portion 12, as shown in FIG. 1, after the latter has been pulled out to the desired position, although generally it will be feasible to leave the supporting frame 17 with the rollers 18 permanently secured at the outer end of the conveyor arrangement. The leg structures as at 26 may also be equipped with wheels as at 18b and 18c (see FIG. 1) if desired, particularly when the conveyor is used in the manner there shown.

As shown in FIGS. 3 and 4, a bracket means such as indicated at 30, is provided for supporting a plurality of conveyor rollers as at 31 mounted thereon, these brackets being formed with spaced-apart supporting rods or pin portions as at 32, adapted to be slidably and removably engaged within the upper ends of the holes or openings 16 in the corrugated structure. Thus, as shown in FIG. 1, the succession of the bracket-supported conveyor roller assemblies may be readily and removably mounted along the top edge of the corrugated structure at suitably spaced intervals which may be altered to suit varying conditions. Also, the form and size, as well as the number and width of the roller arrangements, may be varied, depending upon the particular requirements of the conveyor arrangement when used in various situations.

Inasmuch as the roller-supporting brackets are each secured against turning out of proper position by two of the spaced-apart pins or rods 32, the center line of the rollers 31 of each group will normally be located at right angles to the length of the conveyor and when the conveyor is flexed and curved to one side or the other, such center line will automatically be moved approximately to a position at right angles to a tangent of the curve. Accordingly, as shown in FIG. 1, for example, at places where the conveyor is curved to the right, the right hand ends of the various roller assemblies will be moved to positions closer to each other than the outer or left hand ends thereof. In other words, the axis of each group of rollers will extend approximately radially of the curve of the conveyor. It will be found that when a box or other article is placed on the rollers and conveyed along, its path will follow the curvature of the conveyor with surprising accuracy and without danger of falling off to one side or the other and thus no guide rails are necessary along the sides of the conveyor, even though the conveyor may be flexed or reversely curved in a variety of ways.

In the event that it should be desired to stiffen one or more sections of the corrugated body portion against flexure sideways or to hold certain portions for example in straight condition, or other portions in positions having predetermined curvatures, then this may be easily accomplished in a flexible way by the means shown in FIG. 6. That is, in the event a portion of the corrugated frame means is to be held with a predetermined curvature, then a bracket means as at 40 having a plurality of upstanding lugs or pins thereon, for example in the form shown, three pins, may be positioned with these pins extending as indicated by dotted lines up into the vertical apertures between the corrugations. Thus the bracket as shown at 40 in FIG. 6 will serve to retain the structure with a curvature extending toward the left as viewed in FIG. 6. By changing the position of the bracket 40 end for end, it will be apparent that same may be used for holding the frame means with a curvature veering toward the right. If it is desired rigidly to retain a portion of the frame means in straight condition, then a bracket such as at 41 may be used. It will be understood that the brackets as at 40, 41 may be readily detached by sliding same downwardly and then same may be reapplied at various locations as desired, depending on the desired position of the conveyor in use.

Although a certain particular embodiment of the invention is herein disclosed in detail for purpose of explanation, various modifications thereof, after study of this specification, will be apparent to those skilled in the art to which the invention pertains. Reference should accordingly be had to the appended claims in determining the scope of the invention.

What is claimed and desired to be secured by Letters Patent is:

1. A conveyor construction comprising: a body portion formed of corrugated elongated strip material; supporting means for retaining such body portion with its corrugations in upright position, such body portion being flexible sideways to conform to various desired curved paths; and means for supporting at the upper edge of said body portion a series of groups of rollers, each group being rotatable about a horizontal axis normally positioned at right angles to said body portion.

2. A conveyor construction comprising: a body portion formed of a pair of elongated corrugated strips of sheet material secured together with the ridges of one strip engaging the ridges of the other, whereby a succession of parallel spaced holes is provided therebetween; means for supporting such body portion in a position whereby such holes extend substantially upright, the body portion being flexible from side to side whereby the conveyor may be flexed to follow various desired curved paths; and a succession of spaced-apart groups of conveyor rollers mounted on brackets along the upper edge of said body portion, such brackets having retaining means slidably engageable in said holes.

3. A conveyor construction comprising: a body portion formed of a pair of elongated corrugated strips of sheet material secured together with the ridges of one strip engaging the ridges of the other, whereby a succession of parallel spaced holes is provided therebetween; means for supporting such body portion in a position whereby such holes extend substantially upright, the body portion being flexible in horizontal directions, whereby the conveyor may be shaped to follow various desired curved paths; and a succession of spaced-apart conveyor rollers mounted at the upper edge of said body portion.

4. A conveyor construction comprising in combination: a body portion formed of elongated sheet metal strip means adapted to be flexed throughout from side to side in order to follow desired curved paths, said means having a series of generally vertically extending parallel holes; supporting means at spaced points beneath said strip means and removably secured thereto by rods extending up into the lower ends of such holes; and spaced-apart conveyor roll means arranged along the upper edge of said strip means and removably secured thereto by brackets having retaining rods slidably engageable within the upper ends of said holes.

5. A conveyor construction comprising in combination: an integrally formed sheet metal body portion flexible from side to side but substantially rigid in other directions and constituted of a succession of generally vertically-positioned side-by-side and adjoined tubular portions; means engageable in the upper ends of such tubular portions for carrying conveyor rolls; and supporting means secured to the lower portions of such body portion.

6. A conveyor construction adapted to be flexed from side to side in order to follow desired curved paths, said construction comprising in combination: a body portion formed of a pair of transversely corrugated elongated strips secured together face to face with the ridges on one engaging the ridges on the other, and with the corrugations extending generally vertically; and roller means mounted at the upper edge of such body portion.

7. A conveyor construction adapted to be flexed from side to side in order to follow desired curved paths, said construction comprising in combination: a body portion formed of a pair of transversely corrugated elongated strips secured together face to face with the ridges on one engaging the ridges on the other, and with the corrugations extending generally vertically; roller means mounted at the upper edge of such body portion; a gear element having teeth adapted respectively upon rotation of the gear element to engage successively the corrugations; and means for rotating said element to advance said body portion longitudinally to a desired position.

8. A conveyor construction adapted to be flexed from side to side in order to follow desired curved paths, said construction comprising in combination: a body portion formed of a pair of transversely corrugated elongated strips secured together face to face with the ridges on one engaging the ridges on the other, and with the corrugations extending generally vertically; roller means mounted at the upper edge of such body portion; and supporting means at the lower edge of said body portion secured thereto by pins slidably engaging within holes formed by reason of the corrugations in the body portion.

9. A conveyor construction adapted to be flexed from side to side in order to follow desired curved paths, said construction comprising in combination: a body portion formed of a pair of transversely corrugated elongated strips secured together face to face with the ridges on one engaging the ridges on the other, and with the corrugations extending generally vertically, whereby the corrugations provide generally vertically extending apertures; and means for retaining desired parts of said body portion against sideways flexure, comprising bracket means with spaced-apart pins slidably engageable respectively within certain of said apertures.

10. A conveyor construction in accordance with the foregoing claim 7 and in which at least three of said pins are provided on said bracket means and arranged along a curved path, such pins being slidably removable from said apertures and serving when in place to retain a part of the conveyor body portion in a position extending along such curved path.

11. A conveyor in accordance with claim 6, and in which the roller means are mounted on brackets, each formed with a plurality of pins slidably engaging respectively in holes existing between the ridges of the corrugations.

References Cited in the file of this patent
UNITED STATES PATENTS
2,550,201     Parisi _____ Apr. 24, 1951